Figure 1:
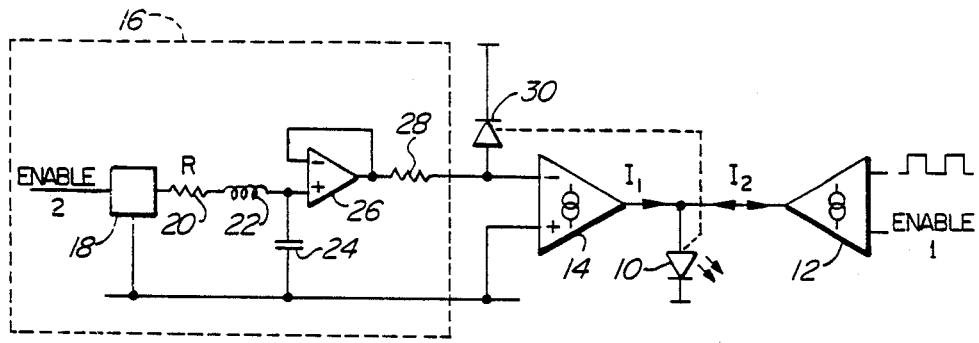

United States Patent [19]

Kahn

[11] Patent Number: 4,868,809
[45] Date of Patent: Sep. 19, 1989

[54] OPTICAL COMMUNICATION SYSTEM
[75] Inventor: David A. Kahn, Nepean, Canada
[73] Assignee: Northern Telecom Limited, Montreal, Canada
[21] Appl. No.: 305,241
[22] Filed: Jan. 2, 1989

Related U.S. Application Data

[63] Continuation-in-part of Ser. No. 869,762, Jun. 2, 1986, abandoned.

[51] Int. Cl.$^4$ .............................................. H04B 9/00
[52] U.S. Cl. ...................................... 370/4; 455/600; 455/608
[58] Field of Search ............... 370/1, 4; 455/600, 606, 455/607, 608, 609, 610, 611, 612, 613, 617, 618, 619

[56] References Cited

U.S. PATENT DOCUMENTS

| | | | |
|---|---|---|---|
| 4,095,097 | 6/1978 | Reeve | 455/608 |
| 4,227,260 | 10/1980 | Vojvodich | 455/607 |
| 4,397,042 | 8/1983 | Tsujii | 455/608 |
| 4,612,671 | 9/1980 | Giles | 455/613 |

Primary Examiner—Robert L. Griffin
Assistant Examiner—Leslie Van Beek
Attorney, Agent, or Firm—R. John Haley

[57] ABSTRACT

An optical communications system comprises a pluarality of optical transmitters coupled by a common channel or bus to an optical receiver. The optical transmitters are operated using time division multiplexing (TDM), each TDM period being word or message length. The optical transmitters each comprise a least one current source to drive the light source, for example a laser, in response to the data signal, to vary its output power about a steady level which is the average of the maximum and minimum values. Therefore each current source may be controlled as to increase its output gradually (preferably sinusoidally) to reach the aforesaid mean level at the beginning of a TDM period and to decrease it in the converse way after the period ends. Such an arrangement avoids the need for guard time before and after the TDM time period, thereby increasing channel efficiency, and improves receiver sensitivity by reducing quantum shot noise due to steady light from inactive transmitters.

6 Claims, 2 Drawing Sheets

OPTICAL COMMUNICATION SYSTEM

This application is a continuation-in-part of application Ser. No. 869,762 filed June 2, 1986, now abandoned.

This invention relates to an optical communications system and is particularly concerned with such systems in which a plurality of optical transmitters are connected to an optical receiver by way of a common channel or bus, using time division multiplexing and word or message rather than bit-partitioning. Each transmitter is coupled to the bus by a three-port power combining device. In such systems, difficulties arise because the optical path loss can vary for different paths between the transmitter and receiver, mainly because the transmitters are different distances away from the receiver but also because of differing coupling losses. As a result, the power level at the receiver will change when a different transmitter takes over the bus. This necessitates an appropriate alteration in the decision threshold level of the receiver.

It is possible, of course, to provide a short time interval (guard time) between data bursts to allow time for detection of power levels and changing of the receiver's decision threshold level. A disadvantage of this approach, however, is that the guard time intervals reduce the utilization efficiency of the communication channel or bus.

One approach to cutting down on the overhead associated with the use of the guard time, is to arrange for each transmitter to transmit during the non-bursting periods, a constant power level equal to the average power, and to arrange line code to have no DC content, allowing regeneration to take place by means of a zero-crossing detector. For example, where the normal transmission code is binary biphase, the power transmitted between bursts would correspond to the half-peak level. Such a system requires in principle no overhead associated with the variations in power levels between transmitters.

However, these arrangements have a major disadvantage in that the sum of all the average powers from the plurality of transmitters results in a DC photocurrent at the receiver which generates wideband noise, resulting in a reduction in receiver sensitivity.

An object of the present invention is to provide an improved optical communications system.

In accordance with one aspect of the present invention there is provided an optical communications system comprising: an optical communication channel; a plurality of transmitters, each coupled to said channel; a receiver, coupled to said channel for receiving light from each of said plurality of transmitters; and means for synchronizing said plurality of transmitters for operating in a time division multiplex mode; each of said plurality of transmitters comprising a light source and drive means, responsive to a data signal comprising a plurality of bits, for modulating said light source in dependence upon the data signal and with respect to a predetermined output power level during its respective predetermined time period, wherein said drive means is arranged to drive said light source during a first time period immediately preceding said predetermined time period such that its output power increases gradually to said level and during a second time period immediately following said predetermined time period so that its output power decreases gradually from said level, each of said first and second time periods being substantially greater than a bit period of the data signal, the output power during each of said first and second time periods having a predetermined waveform of substantially lower spectral content than the data signal; said receiver comprising means for detecting the light signal for providing a combined signal, means for filtering of said combined signal for deriving the data signals from the combined signal.

In accordance with another aspect of the present invention there is provided a method of communicating data signals comprising the steps of: transmitting an optical signal from each of a plurality of time division multiplexed transmitters, the optical signal from each transmitter comprising light modulated with a data signal, comprising a plurality of bits, about a predetermined power level during a predetermined time period, light with a power gradually increasing to said power level during a first time period preceding said predetermined time period, light with a power gradually decreasing from said power level during a second time period following said predetermined time period, each of said first and second time periods being substantially greater than a bit period of the data signal; in a single receiver, receiving the optical signals from said plurality of transmitters with said predetermined time periods of the optical signals multiplexed in time; and the output power during each of said first and second time periods having a predetermined waveform of substantially lower spectral content than the data signal; filtering a combined signal in the receiver to derive the data signals from the combined signal.

Effectively, the power is switched instantaneously between three levels- an average level, in the absence of a data signal and a maximum level and a minimum level corresponding to the maximum and minimum levels, respectively, of the data signal. This permits substantially instantaneous changeover from one transmitter to the other since the receiver's comparator/threshold is set to the aforesaid average value. The output power of each transmitter has a gradually increasing ramp waveform as a precursor to its own assigned time period and a gradually decreasing ramp waveform posterior to its time period or frame of data.

Each ramp waveform may extend in amplitude from a substantially zero light level to an average light level, for example a mean of the sum of the maximum and minimum light levels. The data signal may then vary the light level about this average light level. The ramp is long relative to a bit period of the data and may conveniently be equal to said time period or duration of the data frame.

Ideally the shape of the "turn-on" or precursor ramp waveform should be that of a first half of a sine wave, that is between its minimum and maximum values and the shape of the "turn-off" or posterior ramp waveform should be that of the "falling", second half of the sine wave that is from its maximum to its minimum value.

The drive means may comprise two source means, one for driving the light source in response to the data signal, and responding virtually instantaneously to signal changes. The other source means may generate the average power level and, where applicable, the ramps, and exhibit a slower response.

Preferably, the data to be transmitted employs a balanced line code so that the spectral content of the data is low at low frequencies. Where a balanced binary code is used, the mean level during the data burst is equal to the mean of the "1" and "0" levels. Balanced ternary or pseudoternary codes, for example, may also be employed.

Figure 2:
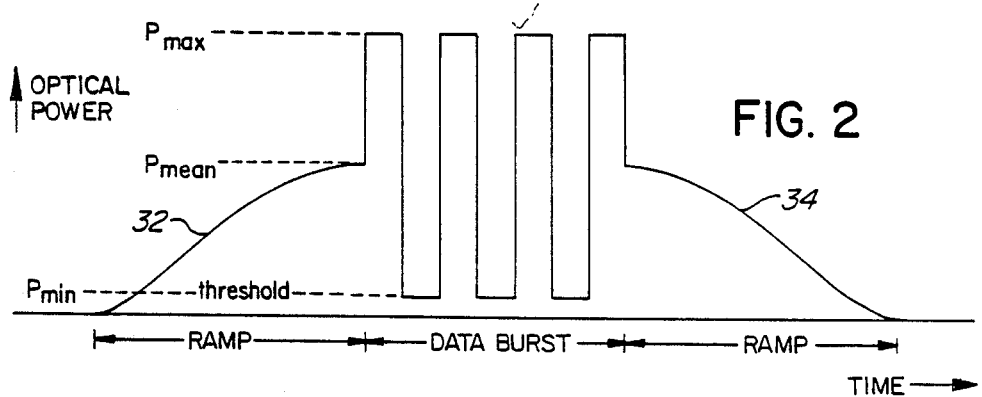
Figure 3:
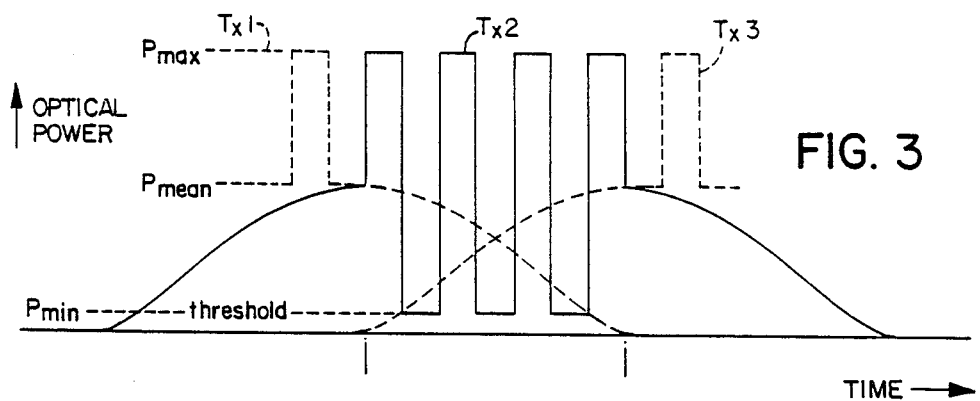
Figure 4:
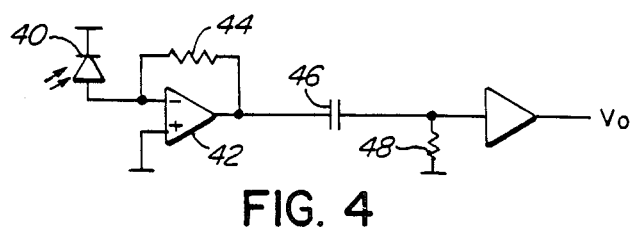

The present invention will be further understood from the following description with reference to the drawings in which:

FIG. 1 schematically illustrates an optical transmitter for an optical system in which a plurality of such transmitters are coupled by a common channel to an optical receiver;

FIG. 2 graphically illustrates the output waveform of the transmitter;

FIG. 3 graphically illustrates components of the waveform "seen" by the receiver;

FIG. 4 schematically illustrates an optical receiver; and

Figure 5:
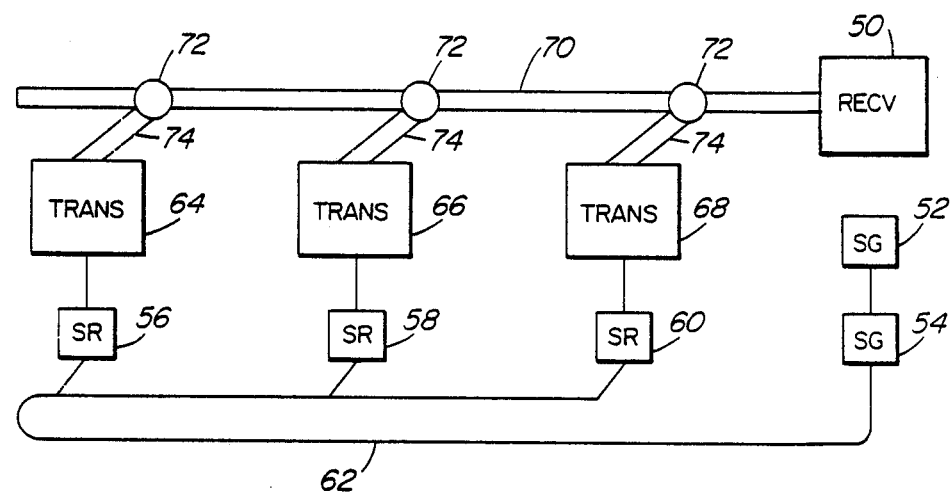

FIG. 5 illustrates in a block diagram, an optical communication system in accordance with an embodiment of the present invention.

The transmitter shown in FIG. 1 comprises a laser diode 10 driven, in common, by drive means in the form of two current sources comprising amplifiers 12 and 14, respectively. The data to be transmitted is applied to one input of amplifier 12 and an enabling signal, designated ENABLE 1, is applied to the other. When signal ENABLE 1 is high the current $I_2$, supplied by current source amplifier 12, swings about a mean value and between a maximum value $+I_M$ and a minimum value $-I_M$. The output power of the laser diode 10 correspondingly varies about a mean value $P_{mean}$ and between maximum value $P_{max}$ and minimum value $P_{min}$ as shown in FIGS. 2 and 3.

For simplicity of description, only one transmitter is shown in FIG. 1. It should be understood, however, that a system according to the invention will have several such transmitters coupled via a common channel to the same receiver. Hence the light output from each light source 10 will be "combined" with that from the others.

Current source 14 is driven by a ramp signal generator 16 comprising a step function generator 18, and a filter formed by a series resistor 20, series inductor 22 and shunt capacitor 24. The resistor 20 and the inductor 22 are connected in series between the output of step function generator 18 and the non-inverting input of a buffer amplifier 26. The capacitor 24 is connected between such non-inverting input and ground.

The output of the buffer amplifier 26 is connected by a series resistance 28 to the inverting input of current source amplifier 14 and to the anode of a photodiode 30. The cathode of the photodiode 30 is connected to the bias rail. The photodiode 30 is positioned so as to receive light from the laser 10. In practice, the photodiode 30 will usually be mounted facing the back facet of the laser 10.

An enabling signal, designated ENABLE 2, (synchronized to enabling signal ENABLE 1) is applied to the input of step-function generator 18. The stepped waveform from the output of step-function generator 18 is modified by the RLC filter. The value of the resistance 20 is such that the LC combination is substantially critically-damped. Hence, the output of the filter is its critically-damped step response which approximates to the rising half of a sine wave, that is, between minimum and maximum values as indicated at 32 in FIG. 2.

This sine wave signal, applied by way of buffer amplifier 26 to the current source 14, produces a corresponding current $I_1$ to be applied to laser diode 10. Optical feedback between the laser diode 10 and the photodiode 30 stabilizes the laser output over a long time period.

The timing of the two enabling signals, ENABLE 1 and ENABLE 2 is so arranged that, when the sine wave ramp reaches its maximum, which is actually the mean level for the data signal, the data signal is applied to the current source 12. The respective gains are such that the output of the current source 12 alternately doubles the current in the laser diode 10 to $+I_M$ and reduces it to $-I_M$, which is substantially zero, actually just above the threshold value for the laser.

When the data burst (in this case comprising 4 bits) has ended, the output power level falls virtually instantaneously to the mean. If a slower fall were permitted, the receiver's threshold level would not have the correct relationship to the mean of the input signal during the first few bits of the next frame. The output of the step-function generator 18 is then effectively grounded, causing the current from current source 14, and hence the output power, to decay, as shown at 34 in FIG. 2, with a waveform that is approximately the second half, that is, from a maximum to minimum, of the sine wave.

It will be noted that the data comprises a balanced line code. Consequently, the DC component of the signal is independent of the data content. The line code is of the balanced "binary" type so the mean level during the data burst is equal to the mean of the "1" and "0" levels, that is the number of 1's is equal to the number of 0's.

Because the drive current for the transmitter is only turned on when it is needed to transmit data, the mean current from transmitters that are inactive is much less that it would be if the transmitters were on continuously at their mean power level. Consequently steady state light from inactive transmitters, aggregating at the receiver, is less. This reduces quantum or shot noise, improving receiver sensitivity.

Because the spectral content of the ramps 32 and 34 is low compared to the spectral content of the data burst, a suitable high pass filter at the receiver (see FIG. 4) will filter out the ramps. The amplitude of the ramining signal will still vary from transmitter to transmitter but the decision threshold will remain at the same, substantially zero level at all times, (where the transmitters are a.c. coupled).

Illustrated in FIG. 3 are light signals from three transmitters, TX1, TX2, and TX3. These comprise the data burst of TX2, the decaying ramp following the immediately preceding data burst of TX1, and the rising ramp of the immediately traily burst of TX3. These are shown superimposed on one another, no summed as the actual signals appear to be to the receiver, for the purpose of illustrating relative positioning of the ramps and data bursts from the three transmitters. The aggregate light which forms the photocurrent at the receiver will show a combination of a relatively slow variation related to frame duration and a relatively fast variation following the data burst. As a new frame begins and the old frame finishes, there will be no instantaneous change in the average photocurrent, but there will be an instantaneous change in the data burst peak-to-peak photocurrent amplitude. For simplicity, each received light signal is shown at the same power level. In actual use the signal received from each transmitter may have a different power level due to differing optical path losses and coupling losses.

As stated earlier, the low frequency component constituting the rising and falling ramps is at a lower frequency than the data burst and so is removed by a high pass filter at the input to the receiver. In the specific embodiment, the first current source responds fast enough to follow the data burst. On the other hand, the second source means to too slow to follow the data burst.

FIG. 4 shows the receiver and associated high pass filter. The light signal is received by a photodiode 40 which has its anode connected to inverting input of an amplifier 42 which has its non-inverting input grounded. The amplifier 42 has a feedback resistance 44 between its output and its inverting input, thus constituting a transimpedance amplifier. The output of amplifier 42 is also connected by way of a series capacitor 46 in common to a second resistance 48 and the input of a second amplifier 50, which serves as a buffer. The capacitor 46 and resistance 48, the other terminal of which is grounded, constitute the aforementioned high pass filter, with a characteristic $$H(f) = \frac{1}{1 + sRC}.$$

Referring to FIG. 5, there is illustrated a communications system in accordance with an embodiment of the present invention. A receiver 50 is coupled to an optical communications channel 70 for receiving light signals from transmitters 64, 66, and 68, each coupled to the channel 70 by a fiber 74 and a three-way power coupler 72. A synchronization generator 52 is coupled to a separate synchronization channel 62 via a synchronization transmitter 54. Synchronization receivers 56, 58, and 60 each collocated with transmitters 64, 66, and 68, respectively, and coupled thereto, are each coupled to synchronization channel 62.

In operation, synchronization generator 52 produces a synchronization signal which is broadcast to the synchronization receivers by the synchronizatio transmitter 54. The receivers 56, 58, and 60 are coupled to synchronization channel 62, so that the synchronization receiver 56 receives the synchronization signal first. The synchronization receiver 56 detects a first part of that signal, which corresponds to a first predetermined time period, and produces an enabling signal for transmitter 64, to initiate its transmission to the receiver 50. As discussed above with reference to FIGS. 1-3, the power level of the transmitter output is gradually increased during the first time period. Then the data signal is produced during the predetermined period for transmitter 64. This is followed by a second time period in which the output power level of the transmitter is gradually decreased.

The second synchronization receiver 58 detects a second part of the synchronization signal, which corresponds to a second predetermined time period, and produces an enabling signal for the transmitter 66. The transmitter 66 operates as does transmitter 64, to produce a data signal during its predetermined time period, with increasing preceding and decreasing trailing waveforms. Because of similar transit delays through the respective transmitters and because of similar transit times for the signal from transmitter 64 via optical channel 70 and the synchronization signal via synchronization channel 62, the data signal for transmitter 64 precedes the data signal for transmitter 66. The two signals are thus time division multiplexed on the optical channel 70. Similarly, the synchronization of transmitter 68 causes its data signal to be time division multiplexed behind, in time, those of transmitters 64 and 66.

As discussed above in connection with FIG. 4, filtering in the receiver removes the power output component attributable to the increasing and decreasing waveforms, to leave the time division multiplexed data signals.

It should be appreciated that other shapes of ramp may be used to provide the "predetermined waveform", provided that the spectral content of the ramps is below the spectral content of the data, so that the two can be separated by means of a suitable filter. However, the disclosed ramps are preferred for the additional benefit of reduced quantum or shot noise.

It should be noted, that the term "average" is used herein in its broad sense to cover, inter alia, mean, median, and mode.

Numerous modifications, variations and adaptations may be made to the particular embodiments of the invention described above without departing from the scope of the invention, which is defined in the claims.

What is claimed is:

1. An optical communications system comprising:
   an optical communication channel;
   a plurality of transmitters, each coupled to said channel;
   a receiver, coupled to said channel for receiving light from each of said plurality of transmitters; and
   means for synchronizing said plurality of transmitters for operating in a time division multiplex mode;
   each of said plurality of transmitters comprising a light source and drive means, responsive to a data signal comprising a plurality of bits, for modulating said light source in dependence upon the data signal and with respect to a predetermined output power level during its respective predetermined time period, wherein said drive means is arranged to drive said light source during a first time period immediately preceding said predetermined time period such that its output power increases gradually to said level and during a second time period immediately following said predetermined time period so that its output power decreases gradually from said level, each of said first and second time periods being substantially greater than a bit period of the data signal, the output power during each of said first and second time periods having a predetermined waveform of substantially lower spectral content than the data signal;
   said receiver comprising means for detecting the light signal for providing a combined signal, means for filtering of said combined signal for deriving the data signals from the combined signal.

2. An optical communications system as claimed in claim 1, wherein said means for synchronizing comprises a synchronization signal generator, a synchronization channel coupled to said generator, and a plurality of synchronization receivers each coupled to said synchronization channel for receiving a synchronization signal from said generator and to a respective one of said plurality of transmitters for providing an enabling signal thereto.

3. An optical communications system as claimed in claim 2, wherein said drive means includes a first source means responsive to said data signal and a second source means responsive to said enabling signal for generating a step waveform, said second source means including filter means responsive to said step waveform to provide a signal varying according to the predetermined waveform.

4. An optical communications system as claimed in claim 3, wherein said second source means is further responsive to a monitoring device coupled optically to said light source.

5. An optical communications system as claimed in claim 4, wherein said drive means is arranged to provide a substantially sinusoidal predetermined waveform.

6. A method of communicating data signals comprising the steps of:

transmitting an optical signal from each of a plurality of time division multiplexed transmitters, the optical signal from each transmitter comprising light modulated with a data signal, comprising a plurality of bits, about a predetermined power level during a predetermined time period, light with a power gradually increasing to said power level during a first time period preceding said predetermined time period, light with a power gradually decreasing from said power level during a second time period following said predetermined time period, each of said first and second time periods being substantially greater than a bit period of the data signal;

in a single receiver, receiving the optical signals from said plurality of transmitters with said predetermined time periods of the optical signals multiplexed in time; and the output power during each of said first and second time periods having a predetermined waveform of substantially lower spectral content than the data signal;

filtering a combined signal in the receiver to derive the data signals from the combined signal.

* * * * *